United States Patent [19]

Stone

[11] Patent Number: 4,747,514

[45] Date of Patent: May 31, 1988

[54] ELECTRONICALLY CONTROLLED, PROGRAMMABLE DISPENSER FOR MEDICATIONS

[75] Inventor: Forrest D. Stone, Salt Lake City, Utah

[73] Assignee: John M. Trondsen, Seattle, Wash.

[21] Appl. No.: 831,810

[22] Filed: Feb. 21, 1986

[51] Int. Cl.⁴ .............................................. B65D 83/04
[52] U.S. Cl. .......................................... 221/4; 221/15; 221/82
[58] Field of Search ............................ 221/2, 3, 4, 5, 15, 221/82, 83, 86; 364/479; 206/534, 538, 539, 533

[56] References Cited

U.S. PATENT DOCUMENTS

| | | | |
|---|---|---|---|
| 3,712,507 | 1/1973 | Holt | 221/82 |
| 3,998,356 | 12/1976 | Christensen | 221/2 |
| 4,360,125 | 11/1982 | Martindale et al. | 221/2 |
| 4,381,059 | 4/1983 | Schurman | 221/91 X |
| 4,473,884 | 9/1984 | Behl | 221/3 X |
| 4,504,153 | 3/1985 | Schollmeyer et al. | 221/2 X |
| 4,572,403 | 2/1986 | Benaroya | 221/15 X |
| 4,573,606 | 3/1986 | Lewis et al. | 221/15 X |

*Primary Examiner*—F. J. Bartuska
*Attorney, Agent, or Firm*—Mallinckrodt & Mallinckrodt

[57] ABSTRACT

Mechanism for dispensing medication or other items in timed sequence over an extended period of time has a programmable, electronic, information storage and control system monitored by sensors associated with item delivery parts of the mechanism. The mechanism comprises individual cylinders provided with corresponding circles of item-receiving compartments and stacked on and keyed to a column of individual blocks that are affixed against relative axial movement but are independently rotatable on a shaft that is itself axially movable to determine from which cylinder dispensing shall take place. Through-openings in the respective cylinders are adapted to be aligned as a chute for compartment filling and dispensing purposes. The block and shaft arrangement is useful in other types of mechanism and is considered as a subcombination of the overall invention.

21 Claims, 5 Drawing Sheets

ELECTRONICALLY CONTROLLED, PROGRAMMABLE DISPENSER FOR MEDICATIONS

BACKGROUND OF THE INVENTION

1. Field

The invention relates to dispensing apparatus for medications, such as pills and vitamins, or for other items to be either consumed or used at set intervals, and to mechanisms in general for initiating a series of operations in timed sequence.

2. State of the Art

Various devices have been developed heretofore for automatically dispensing pills at pre-established intervals in accordance with schedules prescribed by physicians and for alerting the user to various conditions of operation, see particularly U.S. Pat. Nos. 4,473,884, 4,360,125, 4,504,153, and 4,381,059. Yet, there has remained a need for more versatility and use of standard commercially available parts in machines of this type.

3. Objectives

In the making of the present invention, principal objectives were to provide a mechanically and electronically reliable machine and system that can accept and store multiple items for automatic dispensing at accurately timed intervals over an extended period of time, e.g. a week, on a programmed basis, while alerting the user to the fact that individual items have been dispensed and are awaiting pick-up, and to other pertinent information concerning the device and its operative cycles.

BRIEF SUMMARY OF THE INVENTION

In accomplishing the foregoing objectives of the invention, a unique dispensing mechanism is subject to automated control on a programmed basis providing for timed sequential dispensing of preloaded items along with informing the user of operative factors significant to effective use of the items.

The mechanism has a number of container elements, preferably relatively short cylinders, equal in number to the days covered, e.g. seven, stacked on a common axis of rotation as an elongate composite cylinder for sequential turning under control of the operating system. Each container element is provided circularly about its axis with a number of individual compartments, which, in the case of pills or other medication, may correspond in number to the number of times per twenty four hour period that medication is prescribed.

In the preferred embodiment, the cylinders are stacked vertically and the compartments are recesses opening at the bottom surface of a component cylinder of the composite assembly, extending upwardly therefrom, and closed at the top surface of the cylinder. Each cylinder is provided with a single through-passage within the same circle in which the recesses are located, so that, when the through-passages of all cylinders, from the bottom one upwardly to the highest cylinder from which dispensing is to take place at any given time, are aligned, they and the recess from which dispensing takes place form a chute through which the individual item concerned is delivered to the bottom of the stack into a receptacle to await pick-up by the user of the machine.

Rotational movement is imparted to the cylinders sequentially from top to bottom of the stack by a column of individual blocks to which each cylinder is keyed. The column of blocks is rotatably mounted on a shaft, which is shiftable axially in one direction or the other incrementally to sequentially bring sets of mutually confronting, bottom and top cylinder surfaces into respective common slip planes with corresponding block surfaces, whereby the cylinder and block or the group of cylinders and blocks above or below the particular slip plane concerned at any given time, depending upon whether the stack is right-side-up for dispensing purposes or upside-down for filling purposes, is rotatable relative to the other cylinder and block or group of cylinders and blocks. The blocks are non-symmetrical with respect to the axis of the shaft, so as to key into the associated cylinders and prevent rotation relative thereto.

The programmable control system is made up of standard components, which preferably include sensing devices, such as ordinary relay switches, and a conventional microprocessor utilizing integrated circuits formed on silicon chips in customary manner.

The mechanical structure employing a composite cylinder made up of stacked individual cylinders mounted on a column of blocks to which they are keyed and the column of blocks being mounted, in turn, on a shaft that is axially movable incrementally in one or the other direction so as to sequentially establish respective slip planes for segregating a rotatable portion of the stacked cylinders and their corresponding blocks of the column from a non-rotatable remainder of the stack and column, is applicable generally, apart from the field of dispensing, for example, in controlling various operations in timed sequence. As such, whether the column of blocks and the shaft are oriented vertically or horizontally, the mechanism constitutes a subcombination of the overall dispensing invention.

THE DRAWINGS

The best mode presently contemplated for carrying out the invention in actual practice is illustrated in the accompanying drawings, in which.

DETAILED DESCRIPTION OF THE ILLUSTRATED EMBODIMENT

Figure 4:
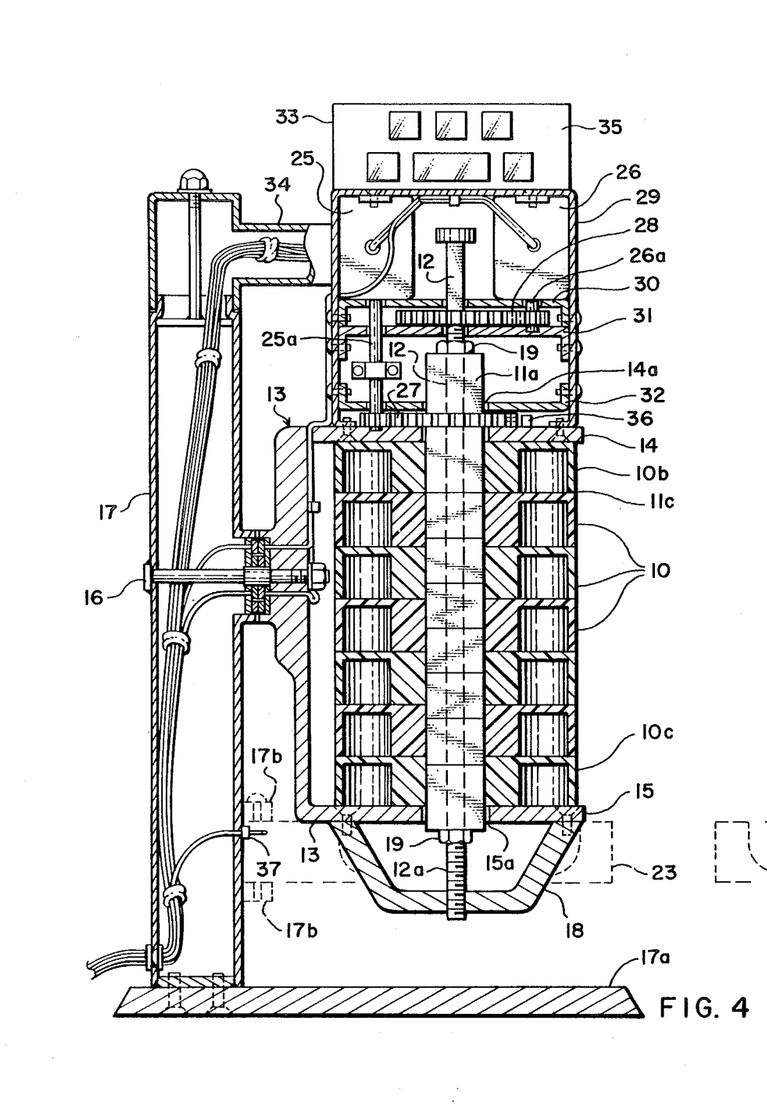
FIG. 4, a vertical section taken on the line 4—4 of FIG. 3, except for the item-receiving compartments which appear in axial section, the delivery tray in the foreground being indicated by dotted lines.
Figure 5:
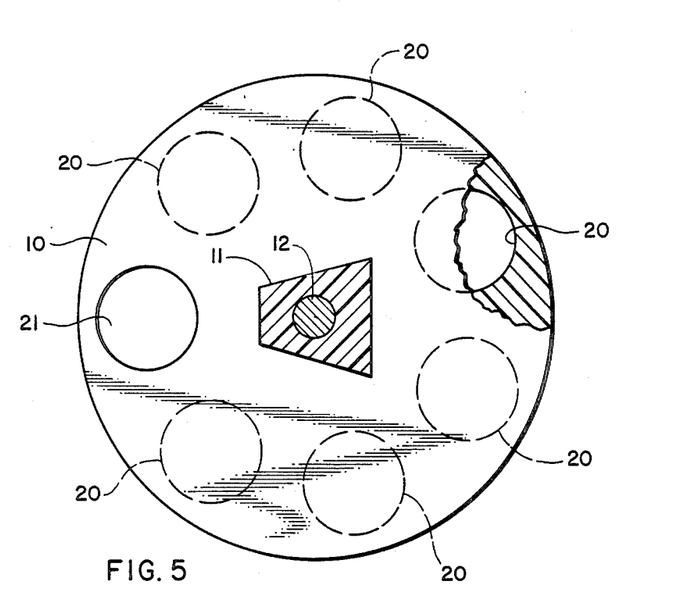
FIG. 5, a horizontal section taken on the line 5—5 of FIG. 1 with a portion broken out to show part of an item-receiving compartment.

In the form shown, the machine of the invention comprises a vertical stack of individual cylinders 10 keyed to a column 11 of individual blocks, FIGS. 4 and 5, which are rotatably mounted on a shaft 12. This composite structural assemblage is mounted in a bracket type of frame 13, FIG. 2, which provides a top plate 14 and a bottom plate 15 for the stack of cylinders and is pivotally mounted at 16 on a supporting post 17 having a base 17a for resting on a table or other support.

Shaft 12 is mounted for simultaneous rotation and axial movement in either one or the other direction by having its normally lower end 12a threaded into a relatively narrow structure 18 fixedly depending from bottom plate 15 of supporting bracket frame 13. Column 11 of blocks is rotatably mounted on shaft 12, being held in position thereon against axial movement relative thereto by upper and lower placement nuts 19, which are not cinched so tightly as to preclude rotation of the individual blocks of the column. Thus, block column 11 moves axially as a unit with axial movement of shaft 12.

The individual blocks are non-symmetrical with respect to the axis of shaft 12, here being of generally triangular configuration, for keying the cylinders 10 relative to the blocks by fitting closely into corresponding openings 10a centrally of the respective cylinders. Upper block 11a of the column is relatively elongate so as to extend through a large accommodating opening 14a in top plate 14 of bracket frame 13 and make connection with power means to be described, while the lower block 11b is somewhat less elongate to fit closely but slidably within an accommodating opening 15a in bottom plate 15 of bracket frame 13.

When shaft 12 is rotated by the power means in the right-side-up orientation of the machine, its threaded lower end 12a is screwed farther into or out of structure 18 to first bring the lower surface of upper block 11a into registry with the lower surface of upper cylinder 10b, if it is not already in such registry, to provide a slip plane 11c.

Each cylinder 10 constitutes a rotary container element for items to be dispensed. These container elements are respectively provided with individual item-receiving compartments around similar circles having the axis of shaft 12 as their centers. In the form illustrated, each cylinder 10 is provided with a circular series of six recesses 20 providing respective medication receiving and holding compartments and a similar through-passage 21, the recesses opening from the lower surface of the cylinder upwardly and all except the one that forms through-passages 21 being closed at the upper surface of the cylinder. Through-passages 21 of the several cylinders are such that, when all from the lowest cylinder 10c upwardly of the column to the highest cylinder from which dispensing is to take place are aligned, they and the particular compartment 20 from which dispensing takes place form a chute 21a, FIGS. 1 and 2, through which the individual item concerned is delivered to the bottom of the stack and through a registering hole 22 in bottom plate 15 of bracket frame 13 into a receiving recess 23a of a delivery tray 23. As shown, tray 23 is pivotally mounted by means of an arm 23b and pivot pin 24, FIG. 2, between two ears 17b, respectively, of post 17.

Power input to the machine may be accomplished in various ways. For example, oppositely oriented, one-way clutches mounted in common on a single shaft that is rotated either clockwise or counterclockwise by a reversible electric motor may be employed in conjunction with appropriate gearing to drive shaft 12 in one direction and the column of blocks 11 in either the same or reverse direction as may be required in accordance with the programming of the machine. However, with this arrangement, relatively complicated provision must be made for manually reversing the direction of rotation of drive shaft 12 for short periods of time to reset its position as and when required. Accordingly, it is preferred to employ the arrangement shown in FIG. 4, wherein two stepper-type electric motors 25 and 26 are provided with respective output shafts 25a and 26a. Motor 25 need rotate in one directly only and is arranged to drive block column 11 unidirectionally through gearing 27. Reversible motor 26 drives shaft 12 either clockwise or counterclockwise through gearing 28, depending on programmed instructions, to reset the positions of the blocks of column 11 relative to the cylinders 10 on clockwise rotation and to move the slip plane exemplified by 11c, FIG. 4, progressively downwardly at a given time, usually once every twenty-four hour period, during any given operative cycle of the machine.

Whatever arrangement of power means is employed, motors and gearing are advantageously located in a protective housing 29 supported by upper plate 14 of bracket frame 13. To permit axial as well as rotary movement of shaft 12 and block column 11, without displacing gearing 27 and 28 that are keyed thereto for rotation therewith while permitting axial movement of such shaft and block column relative thereto, housing 29 is partitioned vertically by horizontal spacer plates 30, 31, and 32, which hold the gearing in place during axial movements of the shaft and block column on counterclockwise rotation.

In normal operation of the machine in the orientation thereof shown in FIG. 4, stepper motor 25 drives uppermost block 11a through gearing 27 to rotate uppermost cylinder 10b incrementally on a timed basis so one compartment 20 after another around the circular series of same come into alignment with chute 21a. Meanwhile, those blocks below slip plane 11c are held against rotation by reason of the keying of lower block 11b of the column to bottom plate 15 of bracket frame 13. After a complete revolution of such cylinder 10b, which normally takes place in a twenty-four hour period, stepper motor 26 is activated in direction to rotate shaft 12 through gear 28 so as to move it downwardly and carry the column of blocks 11 downwardly with it to establish a new slip plane down the column by one block and its accompanying cylinder. This continues down the column until the lowermost cylinder 10 has completed its revolution, whereupon the machine is turned upside-down for refilling. During refilling, shaft 12 is rotated in reverse by stepper motor 26 operating in reverse to bring both shaft and block column again into FIG. 4 orientation.

Once the required pills or other items are appropriately placed in compartments 20 of the cylinders 10 in accordance with the prescribed sequence of taking by the user of the apparatus, the automatic control system is properly programmed from a time standpoint. As shown, the control system is here provided in the form of monitoring and microprocessor means protectively encased in a housing 33, which is pivotally mounted on stand 17 by an arm 34 so as to be swingable toward and away from a position next to housing 29, see FIG. 2, where its display portion of display-control panel 35 is within the line of sight of a person using the machine.

Figure 1:
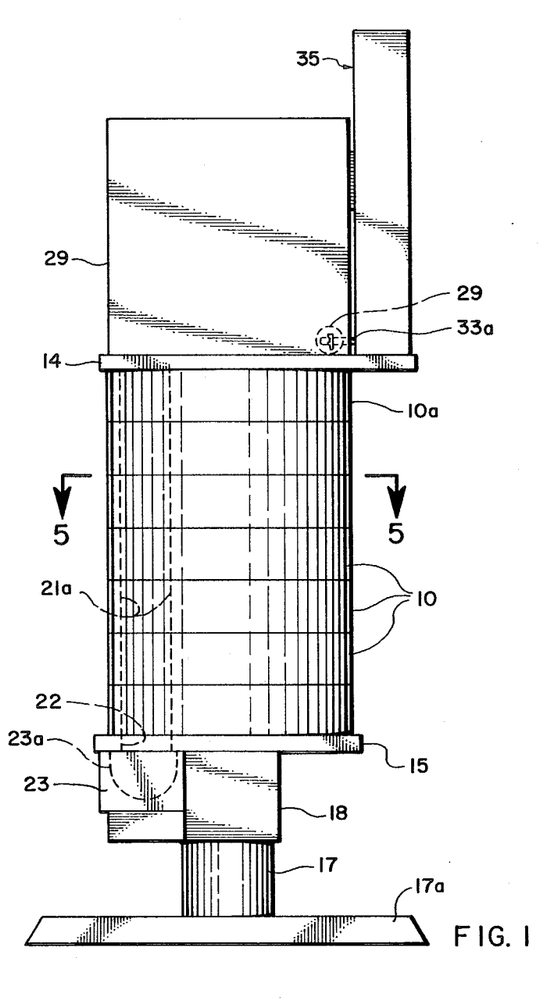
FIG. 1, is a view in front elevation of item-dispensing mechanism, incorporating a vertical stack of individual cylinders rotatably mounted on a vertical column of rotatably mounted, individual blocks, and of the display control panel of a programmable control system in position for viewing from the left, broken lines indicating both the item-dispensing chute formed when the mechanism is in item-dispensing condition and the item-receiving pocket of the delivery tray, as well as the lock for the display-control panel.
Figure 2:
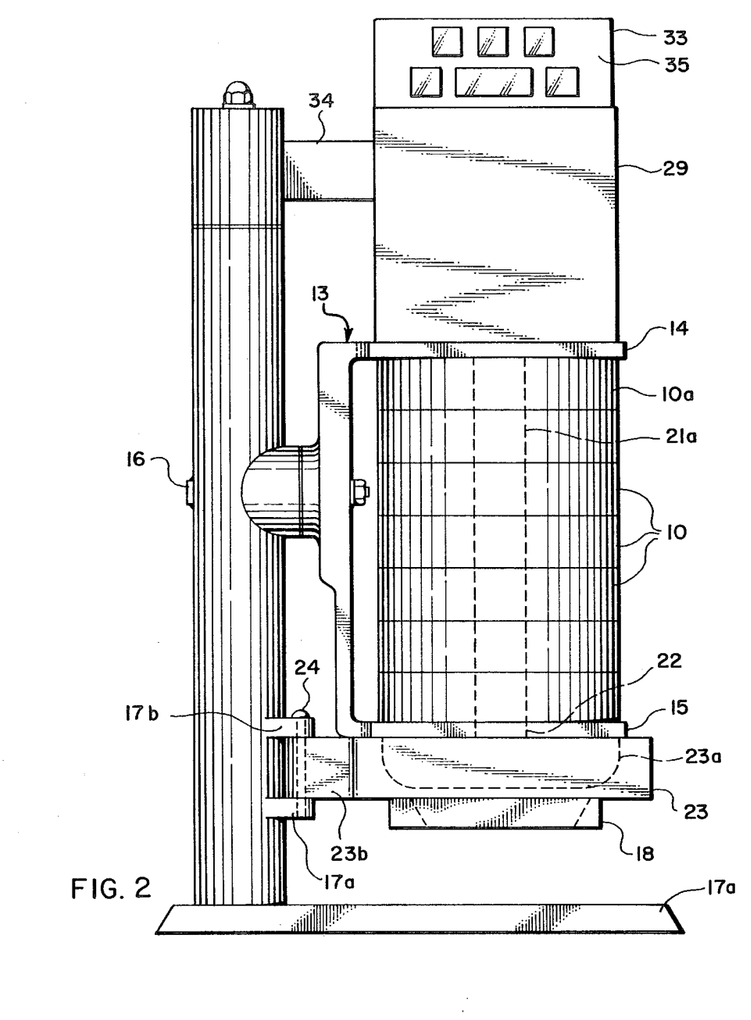
FIG. 2, a similar view in side elevation looking from the left in FIG. 1.
Figure 3:
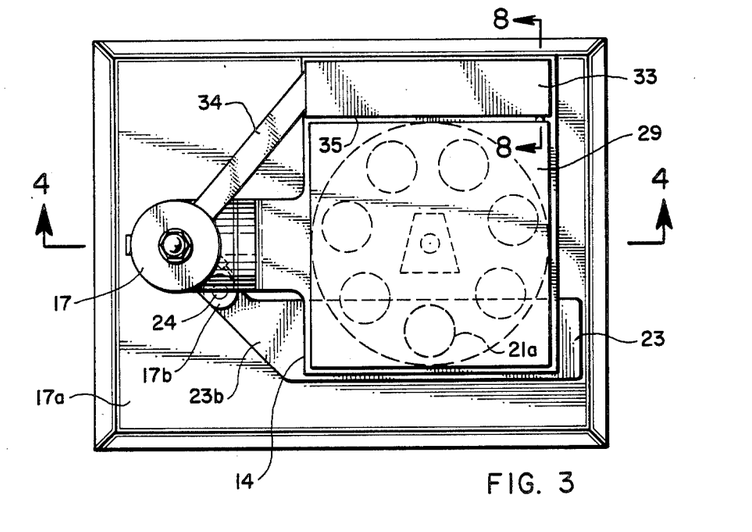
FIG. 3, a view in top plan taken from the standpoint of FIG. 2.
Figure 6:
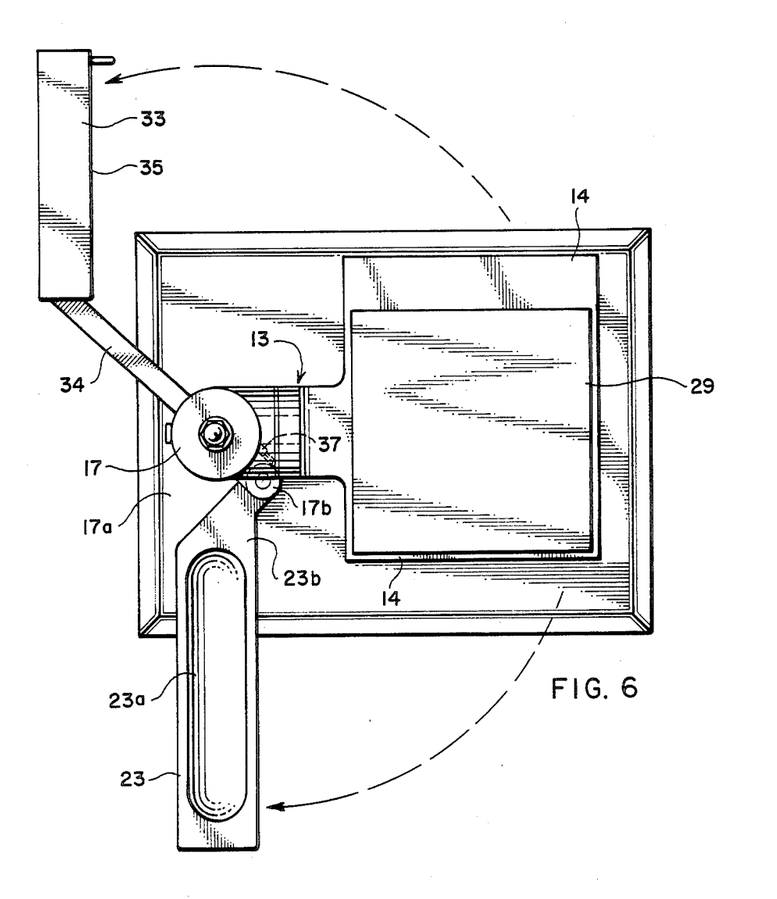
FIG. 6, a view corresponding to that of FIG. 3, but with the display-control panel swung out for programming and with the delivery tray swung out preparatory to inverting the machine for reloading.
Figures 7, 8:
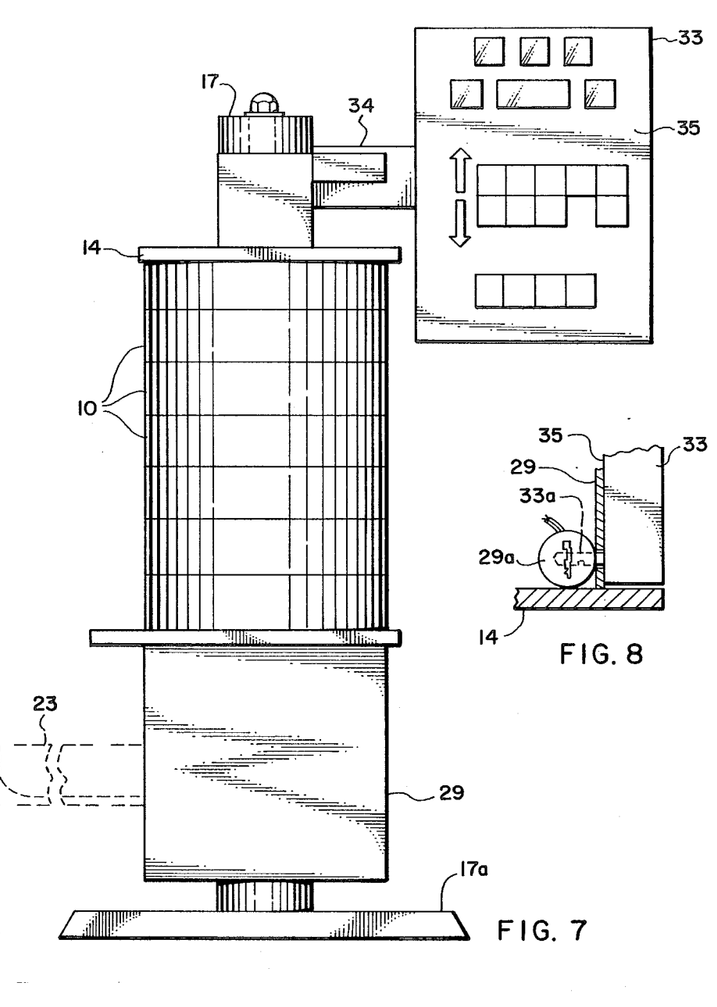
FIG. 7, a view corresponding to that of FIG. 1, but with display-control panel and display tray in the positions of FIG. 6 and the stack of cylinders inverted for reloading.
FIG. 8, a fragmentary vertical section taken on the line 8—8 of FIG. 3, showing an arrangement for locking the display-control panel in operating position.

To prevent inadvertant swinging of housing 33 from the viewing position of display-control panel 35 shown in FIGS. 1, 2, and 3 to the reprogramming position shown in FIG. 6 during the operating period of the machine, it is advantageous to provide means for locking such housing 33 to housing 29. As shown in FIG. 8, the locking means comprises a lock bolt 33a projecting from housing 33 for penetrating a tumbler lock 29a when housing 33 is swung into display-viewing position against housing 29.

The control system advantageously employs monitoring means, in the form of sensing devices, one being a so-called "Home Detector", e.g. an indicator switch such as a ferrous metal pin (not shown) embedded in a non-magnetic gear of gearing 27, FIG. 4, operative on a magnetic sensor 36 as a so-called "Home Detector" to detect when all the through passages are aligned to form delivery chute 21a; another being a relay switch 37, FIG. 6, to detect swinging to open position of delivery tray 23, and a third being a relay switch (not shown) in connection with display panel lock 29a, 33a, FIG. 8, to detect when the control panel is unlocked for swinging movement to loading and programming position. The control system also employs microprocessor means for carrying out the events on a programmed basis and for activating user-information means, e.g. lights 38, FIG. 9, of a visual display of same to alert the user to various stages of operation.

Figure 9:
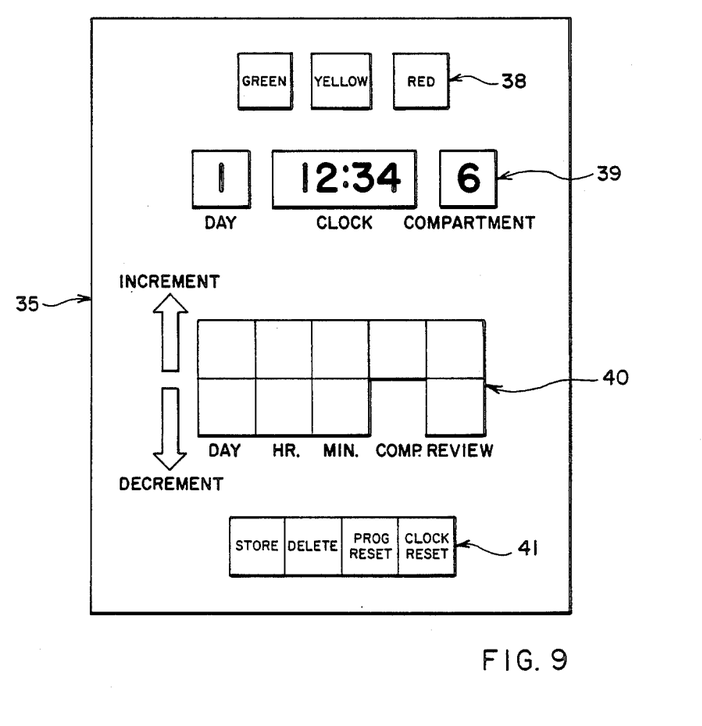
FIG. 9, a view in front elevation of the display-control panel drawn to a larger scale.

As indicated in the full face showing of display-control panel 35 in FIG. 9, the day, time of day, and particular compartment 20 in the particular cylinder 10 concerned are shown by the side-by-side windows constituting the second line 39 of the display. The lights 38 comprise three side-by-side windows constituting the first line of the display for green, yellow, and red lights, respectively, to indicate, respectively, for example, when steady, that all dispensed items have been removed from the machine, that dispensed items are waiting to be removed, and that dispensed items have been waiting for removal over a predetermined length of time, and, when flashing, that a full cycle of operation has been completed, the machine is inoperable, and that the machine has shut down to avoid overdosing in instances of critical drugs.

Banks 40 and 41 of control push buttons, FIG. 9, for use in operating switches to program the machine are below the windowed displays in panel 35 and are available to the user when housing 33 is swung away from its position next to housing 29, as shown in FIG. 6.

Figure 10:
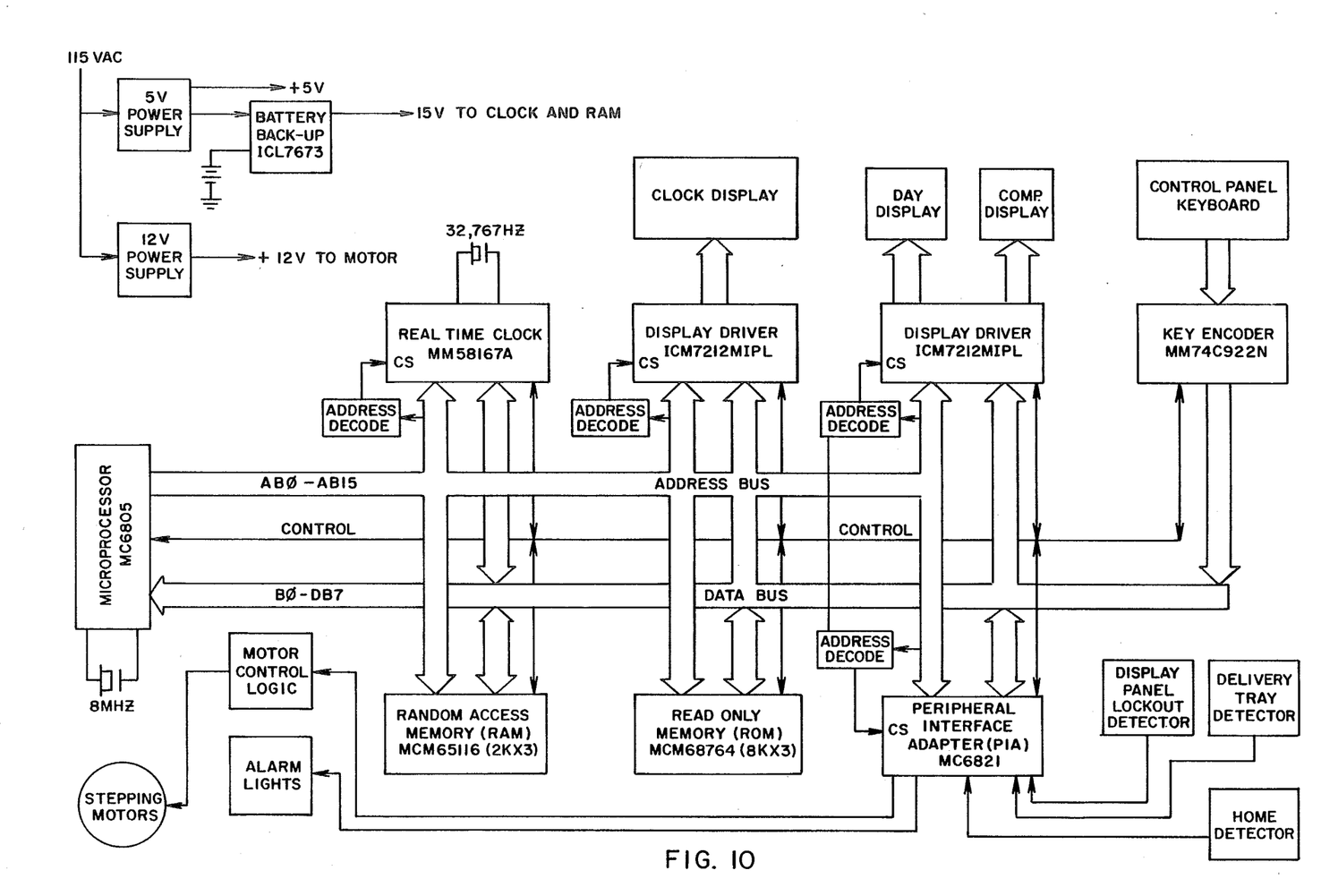
FIG. 10, a block diagram of the programmable control system.

A programmable, microprocessor, control system for the machine is shown by the block diagram of FIG. 10. As there indicated, a standard type of microprocessor is programmed by the user by pushing the control buttons in banks 40 and 41 thereof. The program is stored in a Read Only Memory (ROM) and in a Random Access Memory (RAM). The microprocessor uses Peripheral Interface Adapter (PIA) to control stepping motors 25 and 26 via Motor Control Logic. The PIA also controls the Alarm Lights 38 and reacts to the state of Home Detector switch 36, of delivery tray switch 37, and of the switch actuated by the Display Panel Lockout 29a, 33a, FIG. 8.

All real time automatic control is based on time output from the integrated circuit controlling the Real Time Clock. Power to the Motor Control Logic is provided by a 5 volt DC Power Supply and a 12 volt DC Power Supply. In the event of failure of the usual 115 volt AC power supply, the Real Time Clock and the RAM are powered by battery via a Battery Back-Up circuit, which prevents loss of real time and stored programming instructions. Commercially available integrated circuits are identified by manufacturers' designations, although functionally equivalent circuits may be obtained from other manufacturers under different identification numbers.

The microprocessor interfaces with the system components via the Address Bus, the Data Bus, and the Control Bus (each identified as such in the drawing). After the requested device is selected by decoding the Address Bus lines, the microprocessor either applies data to the Data Bus or reads data from the Data Bus, depending on the nature of the selected system component. The Control Bus passes read/write and interrupt commands between the microprocessor and the system components. The speed of microprocessor operation is determined by an 8 MHZ crystal.

Real Time is generated by the integrated circuit of the Real Time Clock and is based on a 32,768 HZ crystal. The real time hours and minutes generated are read by the microprocessor via the Data Bus. The control program causes the microprocessor to apply the address of the Real Time Clock on the Address Bus every few milliseconds. An Address Decode recognizes the address and applies the time in hours and minutes on the Data Bus, which is then read by the microprocessor, which next addresses a Display Driver and sends the real time data out the Data Bus to be stored in the Display Driver for driving the Clock Display in twenty-four hour format. The microprocessor compares the real time to the values that were stored in the RAM during the manual programming sequence to determine if some operation is required. By using this technique, the timing of pill dispensing, alarm lights, and advance of pick-up tray 23 can be controlled to one minute accuracy.

In use of the device, the day is read by the microprocessor from the Real Time Clock and is transferred to the Display Driver for Day and Compartment to light the Day display window in window bank 39. The compartment number is determined by the microprocessor from a counter in the RAM, but, during filling is advanced when the command is sent to stepping motor 25 by the user manually pushing the button COMP in bank 40 of push buttons.

Output of the Control Panel Keyboard (banks 40 and 41, FIG. 9) is decoded by a Key Encoder circuit. Each time a push button is actuated, an interrupt signal is sent to the microprocessor, which causes the control program stored in the ROM to read the output from the Key Encoder and to perform the requested operation.

Three physical conditions of the dispensing mechanism are monitored and used by the control program as indications of required action. These conditions are compartment position, detected by Home detector 36, delivery tray open, detected by relay switch 37, display panel 35 unlocked, detected by the interconnected relay switch thereof (not shown). In all three conditions, an interrupt signal is sent to the microprocessor via the PIA, which causes the control program to branch to the required location for the requested operation namely, actuation of one or the other of stepper motors 25 and 26, opening of delivery tray 20 for pick-up of dispensed items, and unlocking of lock 29a at the end of any operative cycle.

The Alarm Lights 38 of FIG. 9 are controlled by the microprocessor via data sent to the PIA.

Compartment positioning is accomplished by stepping motors 25 and 26 through commands generated by the microprocessor control program and transmitted to the Motor Control Logic via the PIA.

To prepare the machine for dispensing pills, vitamins, and/or other medications in accordance with any prescribed amounts and scheduling of administration of such amounts throughout a total of six periods within a twenty-four hour day repeated for a total of seven days, compartments 10 must be properly loaded with the items to be periodically dispensed. To accomplish this, programmer housing 33 and delivery tray 23 are swung outwardly ninety degrees from the normal operative positions shown in FIGS. 1–5 to the positions shown in FIG. 6, and then the bracket frame 13 is inverted, i.e., turned upside-down on its pivot axis 16, to the position shown in FIG. 7.

In this inverted position of the machine, starting from HOME condition, loading is effected by dropping into the appropriate number of successive compartments 20 of successive cylinders 10 through discharge opening 22 in bottom plate 15 of bracket frame 13, successive amounts of the medication or medications concerned. The positions of cylinders 10 for this purpose around their respective 360 degrees of rotative movements are set by the user by pushing the button labeled COMP in the bank 40 of push buttons in FIG. 9.

In HOME condition, as shown in doted lines by FIGS. 1 and 2, the through passages 21 of all of the individual cylinders 10 and the discharge opening 22 in plate 15 are aligned to provide chute 21a extending to or from the cylinder that is uppermost in the normal, right-side-up position of the machine. The individual blocks of block column 11 are also all aligned so the block column can be moved upwardly or downwardly through the stacked cylinders. This condition is noted by a zero appearing in the compartment read-out window of the display 39 of FIG. 9 and is activated by the Home Detector, and, when the COMP button of the bank of push buttons 40 is pushed, stepper motor 25 rotates the normally uppermost cylinder 10b on slip plane 11c to bring the first compartment 20 into alignment with chute 21a for filling. The COMP button is pushed successively until the required number of compartments 20 for the first day are brought into line successively for filling. Thereupon, the lower DAY button of bank 40 is pushed to activate stepper motor 26 in the direction that lowers block column 11 to provide the next normally lower slip plane between the next normally lower block and the one normally below it. This means that both the normally uppermost cylinder 10b and the normally next lower one will rotate together when the COMP button is pushed successively to bring the compartments 20 of such normally next lower cylinder successively into line for filling.

The pushing of DAY and of COMP buttons are repeated until the required number of compartments in each of the cylinders 10 are filled, whereupon the machine is again inverted into right-side-up position.

For programming the system in accordance with the prescribed operating schedule, the CLOCK in display bank 39, FIG. 9, is set to the correct time (if this has not been done prior to the loading operation) by pushing the appropriate HR and MIN buttons of bank 40 for actuating either the increment or decrement switches thereof. The CLOCK display will start flashing. When the CLOCK SET switches of the lower row of push buttons in FIG. 9 is pushed, the CLOCK display will stop flashing. The PROG. RESET button is then pushed to actuate its switch and the DAY, CLOCK, and COMP displays will start flashing. The DAY increment and decrement switches are then set to the day, time, and compartment values for the first day of dispensing by pushing the appropriate buttons of bank 40, FIG. 9, whereupon the STORE button is pushed to activate its switch and store the values set for that first day. This programmed sequence will then be automatically repeated for successive days of the total time period.

A DELETE button, FIG. 9, is preferably provided as is common in programmed systems of the general type concerned to enable resetting should a mistake be made during programming.

It should be understood that only the number of compartments 20 in each cylinder 10 that are required for the medication administering schedule will be filled with medication. These will be successive compartments around the circle commencing with the first compartment identified by the appearance of "1" in the COMP window of display window bank 39. The same is not true, however, for the days in the week. If any day is to be skipped in the administering of medication the machine will still go through the programmed sequence with unfilled cylinders as well as those that are filled.

After the stacked cylinders 10 are properly filled and programmed, bracket frame 13 is again inverted to right-side-up position and programmer housing 33 and delivery tray 23 are swung to their normal display and receiving positions of FIGS. 1–5, respectively. Medication will then be dispensed in accordance with the schedule programmed for the ensuing week.

Upon the dispensing of medication into delivery tray 23, the yellow light of display 38 will appear steadily in its viewing window. If the dispensed medication is not picked up from the delivery tray within a prescribed time, the yellow light will go out and the red light will appear steadily in its window. When the dispensed medication is picked up, the green light will appear steadily in its window.

When a full week's cycle of operation has been completed by the machine, the green light will flash on and off. If the machine becomes inoperable during the normal operating cycle, the yellow light will flash on and off, and if the machine has shut down because dispensed medication has not been picked up and more than one of the scheduled doses thereof have accumulated in the delivery tray at any given time, the red light will flash on and off.

Other embodiments of the invention can have the stacked container elements positioned on a horizontal axis, with delivery of the contained items directly from respective compartments arranged circumferentially thereof into a delivery tray extending or movable longitudinally thereof.

Although the device is particularly useful for dispensing medication, many different types of items can be handled, with compartment size and the programming system being modified if necessary to suit. Also, the mechanism comprising stacked blocks rotatable on an axially movable shaft to provide sequential rotatability for elements stacked on the stacked blocks can be applied in a variety of situations, whether vertically or horizontally oriented.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for dispensing a multiplicity of items in timed sequence, comprising several container elements stacked face-to-face for rotation on a common axis, said container elements being provided, respectively, with item-receiving compartments around similar circles having said axis as their centers; a shaft; several blocks unsymmetrical in axial cross-section stacked face-to-face on the shaft as a column of blocks, said blocks being fixed on said shaft against axial movement relative thereto but so that said shaft can rotate relative thereto, said container elements being closely fitted onto said column of blocks so as to be keyed thereto for rotation therewith but permitting axial movement of said column relative thereto; means supporting said stack of container elements, said column of blocks, and said shaft; means for the discharge of items from the individual compartments of said container elements; means for retaining items within the individual compartments except when the respective compartments coincide in position with said discharge means; means for rotating said shaft in opposite directions for adjusting the position of said column of blocks relative to said stack of container elements; means for effecting axial movement of said shaft in opposite directions when rotated in opposite directions; and means for effecting block rotation, the number of the blocks in said column which are rotated at any given time being determined by the axial positions of said blocks.

2. Apparatus according to claim 1, wherein the shaft extends beyond the column of blocks at both ends thereof, one end being connected with the supporting means to effect axial movement in one or the other direction when said shaft is rotated in one or the other direction; wherein the blocks of said column of blocks intermediate the end blocks are of less thickness than the container elements, whereby the end block adjacent to the support-connected end of the shaft is prevented from turning when within said supporting means; and wherein the means for rotating one or more blocks of the column of blocks is connected with the opposite end block of said column.

3. Apparatus according to claim 2, wherein the shaft, the column of blocks, and the stack of container elements are vertically positioned; and wherein the discharge means comprise through-passages in the container elements, respectively, located in the circles in which the item-receiving compartments are located for alignment from time-to-time along the height of the stack of container elements as a chute for dispensing purposes, and a through-passage in the supporting means with which said chute aligns for dispensing purposes.

4. Apparatus according to claim 3, wherein the item-receiving compartments are recesses open at the bottoms of the respective container elements and closed at the tops thereof, the means for retaining items within the individual compartments being said closed tops of immediately underlying container elements.

5. Apparatus according to claim 4, wherein the lower end of the shaft is connected with the supporting means by screw threading to provide for incremental axial movement when the shaft is rotated.

6. Apparatus according to claim 5, wherein the means for rotating the shaft is a reversible stepper motor, and the means for affecting block rotation is also a stepper motor, and wherein there is a programmable, electronic, information storage and control system including a microprocessor for controlling operation of the stepper motors and for enabling a user of the apparatus to schedule item delivery on a predetermined basis.

7. Apparatus according to claim 5, wherein the supporting means comprise a stand, and a bracket frame pivotally attached to said stand for swinging into and out of inverted position, said frame having upper and lower plate members between which the stack of container elements and the column of blocks are positioned, the through-passage in the supporting means being an opening through said lower plate member.

8. Apparatus according to claim 7, including a discharge tray pivotally attached to the stand below the bracket frame for swinging under the discharge opening through the lower plate member and away therefrom.

9. Apparatus according to claim 1, including a programmable, electronic, information storage and control system including a microprocessor for enabling a user of the apparatus to schedule item delivery on a predetermined basis.

10. Apparatus according to claim 7, wherein programmable portions of the information storage and control system are positioned in a housing that is pivotally attached to the stand above the bracket frame for swinging toward and away from said frame, the face of said housing proximate the frame when swung theretoward having user alerting means and programmable control means for said system thereon.

11. Apparatus according to claim 10, wherein the information storage and control system includes monitoring means comprising sensing means associated with the uppermost container element to detect discharge chute positioning of the container elements, and sensing means associated with the delivery tray to detect positioning thereof.

12. Apparatus according to claim 11, including means for locking the information storage and control system housing in bracket frame proximate position; and wherein the monitoring means also includes sensing means to detect the condition of the locking means.

13. Apparatus according to claim 12, wherein the information storage and control system is constructed and arranged to respond to conditions sensed by the respective sensing means and take appropriate actions accordingly.

14. Apparatus according to claim 11, wherein the information storage and control system includes manually operable means for programming timed incremental rotating of each container element so as to sequentially bring the respective compartments thereof into alignment with the delivery chute and for programming timed sequential rotation of the container elements so each will be rotated in turn.

15. Apparatus according to claim 14, wherein the information storage and control system is constructed and arranged to respond to conditions sensed by the respective sensing means and take appropriate actions accordingly.

16. Apparatus according to claim 10, wherein the user alerting means comprises a display of differently colored lights indicative of varius conditions of the mechanism, and the information storage and control system includes means for energizing the respective lights steadily in accord with certain conditions and flashing in accord with other conditions.

17. Apparatus according to claim 6, wherein the information storage and control system includes monitoring means comprising sensing means associated with the container elements to detect discharge positioning thereof.

18. Apparatus according to claim 9, wherein the programmable information storage and control system includes a display of differently colored lights and also includes electrical sensing means, said control system being arranged for steadily lighting one of said lights to indicated that the mechanism has completed a delivery cycle, for steadily lighting another of said lights and extingushing the first light if the delivery tray has not been opened within a prescribed time, for steadily lighting another of said lights when the delivery tray has been opened, for causing one of the lights to flash on and off when a predetermined full cycle of operation of the mechanism has been completed, for causing another of the lights to flash on and off if the mechanism becomes inoperable during said cycle of operation, and for causing another of the lights to flash on and off if the mechanism has shut down because the delivery tray has not been opened within a prescribed time and further operation might cause an excessive accumulation of dispensed items.

19. Apparatus according to claim 6, wherein key-operated locking means are provided for denying access to the information storage and control system during any operative cycle of the apparatus to anyone not provided with a key; and sensing means for detecting unlocked condition of said locking means, said locking means being unlockable at the end of any full cycle of operation by operation of a stepper motor under control of the microprocessor.

20. Sequentially operative mechanism, comprising a shaft mounted for rotation and for movement axially; several blocks unsymmetrical in axial cross-section stacked face-to-face on the shaft as a column and mounted thereon against axial movement relative thereto but so that said shaft is rotatable; several elements stacked face-to-face for rotation about the shaft, said elements being closely fitted onto said column of blocks so as to be keyed thereto for rotation therewith but permitting axial movement of said column relative thereto; means supporting said elements, said blocks, and said shaft; means for effecting axial movement of said shaft in opposite directions when rotated in opposite directions; and means for effecting block rotation, the number of the blocks in said column which are rotated at any given time being determined by the axial positions of said blocks.

21. Mechanism according to claim 20, wherein the shaft extends beyond the column of blocks at both ends thereof, one end being connected with the supporting means to effect axial movement in one or the other direction when said shaft is rotated in one or the other direction; wherein the blocks of said column of blocks intermediate the end blocks are of less thickness than the container elements, whereby the end block adjacent to the support-connected end of the shaft is prevented from turning when within said supporting means; and wherein the means for effecting block rotation in the column of blocks is connected with the opposite end block of said column.

* * * * *